United States Patent
Kim et al.

(10) Patent No.: US 11,190,299 B2
(45) Date of Patent: *Nov. 30, 2021

(54) ETHERNET COMMUNICATION APPARATUS, AND METHOD FOR RECOVERING ERROR OF END NODE AND SWITCH IN VEHICLE

(71) Applicants: HYUNDAI MOTOR COMPANY, Seoul (KR); KIA MOTORS CORPORATION, Seoul (KR)

(72) Inventors: Dong Ok Kim, Goyang-si (KR); Jin Hwa Yun, Seoul (KR); Jeong Seok Han, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,204

(22) Filed: Apr. 21, 2020

(65) Prior Publication Data
US 2020/0252159 A1   Aug. 6, 2020

Related U.S. Application Data

(63) Continuation of application No. 16/045,231, filed on Jul. 25, 2018, now Pat. No. 10,666,393.

(30) Foreign Application Priority Data

Jul. 31, 2017  (KR) .................. 10-2017-0097327

(51) Int. Cl.
*G06F 11/00* (2006.01)
*G06F 11/30* (2006.01)
(Continued)

(52) U.S. Cl.
CPC .......... *H04L 1/0072* (2013.01); *H04L 1/0061* (2013.01); *H04L 49/602* (2013.01);
(Continued)

(58) Field of Classification Search
CPC ... H04L 1/0072; H04L 1/0061; H04L 49/602; H04Q 3/0087; H04Q 2213/13204; H04Q 2213/1305
See application file for complete search history.

(56) References Cited

U.S. PATENT DOCUMENTS 9,515,694 B1 * 12/2016 Sidiropoulos ........... H04L 25/03
9,756,154 B1 *  9/2017 Jiang ..................... H04L 43/028
(Continued)

FOREIGN PATENT DOCUMENTS

CN   103580973 A   2/2014
CN   104635549 A   5/2015

OTHER PUBLICATIONS

Non-Final Office Action issued in U.S. Appl. No. 16/045,231 dated Sep. 19, 2019.
(Continued)

*Primary Examiner* — Samir W Rizk
(74) *Attorney, Agent, or Firm* — Morgan, Lewis & Bockius LLP

(57) ABSTRACT

An error recovery method performed in an end node of an Ethernet-based vehicle network includes: detecting, by a physical (PHY) layer processor of a PHY layer of the end node, a physical error of a message, when the message is received at the PHY layer of the end node; detecting, by a controller processor of a controller included in the end node, a logical error of the message; and classifying, by the controller processor, types of the physical error and the logical error.

17 Claims, 7 Drawing Sheets

(51) Int. Cl.
  *G08C 25/00* (2006.01)
  *H03M 13/00* (2006.01)
  *H04L 1/00* (2006.01)
  *H04L 12/931* (2013.01)
  *H04Q 3/00* (2006.01)

(52) U.S. Cl.
  CPC ... *H04Q 3/0087* (2013.01); *H04Q 2213/1305* (2013.01); *H04Q 2213/13204* (2013.01)

(56) References Cited

U.S. PATENT DOCUMENTS

| | | |
|---|---|---|
| 2008/0186870 A1 | 8/2008 | Butts et al. |
| 2009/0041040 A1 | 2/2009 | Hall et al. |
| 2012/0134262 A1 | 5/2012 | Licardie et al. |
| 2014/0023068 A1 | 1/2014 | Kim et al. |
| 2017/0026149 A1 | 1/2017 | Birrittella |
| 2017/0070576 A1 | 3/2017 | Kim et al. |

OTHER PUBLICATIONS

Notice of Allowance issued in U.S. Appl. No. 16/045,231 dated Jan. 23, 2020.

* cited by examiner

| EthCCHeader 8bytes | CRC 2bytes | Alive Count 1byte | Signals 1~512bytes | Certification message 33bytes |

ETHERNET COMMUNICATION APPARATUS, AND METHOD FOR RECOVERING ERROR OF END NODE AND SWITCH IN VEHICLE

CROSS-REFERENCE TO RELATED APPLICATIONS

This application is a continuation of U.S. patent application Ser. No. 16/045,231 filed on Jul. 25, 2018 which is based on and claims the benefit of priority to Korean Patent Application No. 10-2017-0097327 filed on Jul. 31, 2017 in the Korean Intellectual Property Office (KIPO), which are each incorporated in their entirety herein by reference.

TECHNICAL FIELD

The present disclosure relates to an Ethernet communication apparatus and a method for recovering errors of an end node and a switch in a vehicle, and more specifically, to an Ethernet communication apparatus and a method for error handling and recovery of an end node and a switch according to a type and a level of a physical error or a logical error occurring in the end node and the switch during Ethernet-based communications in an Ethernet-based vehicle network.

BACKGROUND

Electronic devices installed in a vehicle have been increased significantly in their number and variety along with recent digitalization of vehicle parts. Generally, the electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

In recent years, Ethernet has been applied to the vehicle network, but there is no suggestion of error handling and recovery according to the type and level of a physical error or a logical error. Therefore, there is a need for an Ethernet communication apparatus and a method for error recovery, which can perform error handling and recovery according to the type and level of the physical or logical error that occurs during Ethernet communications.

SUMMARY

The present disclosure provides an Ethernet communication apparatus and an error recovery method for the same, which can perform an error handling and recovery according to the type and level of a physical and/or logical error that occurs during Ethernet communications.

In accordance with embodiments of the present disclosure, an operation method performed in an end node including a physical (PHY) layer processor in an Ethernet-based vehicle network may comprise performing, by the PHY layer processor, a monitoring operation of a signal on a port of the end node; detecting, by the PHY layer processor, a physical error in the port based on results of the monitoring operation; and transmitting, by the PHY layer processor, information of the physical error to a controller processor included in the end node.

The information of the physical error may be transmitted from the PHY layer processor to the controller processor through a management data input/output (MDIO).

The physical error may be at least one of a link error, a cyclic redundancy check (CRC) error, a carrier extension error, a false carrier error, a premature end error, a receive (Rx) error, a transmit (Tx) error, and a lock error.

The operation method may further comprise determining, by the controller processor, a type of the physical error based on the information of the physical error; and classifying, by the controller processor, the physical error with a critical error or a non-critical error based on the type of the physical error.

The operation method may further comprise, when the physical error is the critical error, resetting, by the controller processor, the port in which the physical error is occurred.

The operation method may further comprise, when the physical error is the non-critical error, increasing, by the controller processor, an error counter value; and warning, by the controller processor, occurrence of the physical error when the error counter value is less than a threshold.

The operation method may further comprise, when the physical error is the non-critical error, increasing, by the controller processor, an error counter value; and resetting, by the controller processor, the port in which the physical error is occurred when the error counter value is greater than or equal to a threshold.

Further, in accordance with embodiments of the present disclosure, an operation method performed in an end node including a controller processor in an Ethernet-based vehicle network may comprise obtaining, by the controller processor, a message from a physical (PHY) layer processor included in the end node; detecting, by the controller processor, a logical error of the message based on a reference parameter; determining, by the controller processor, a type of the logical error; and increasing, by the controller processor, an error counter value per the type of the logical error.

The reference parameter may be at least one of a message format used in the Ethernet-based vehicle network, information of inner communication nodes belonging to the Ethernet-based vehicle network, and information of outer communication nodes which are allowed to access the Ethernet-based vehicle network.

The logical error may be at least one of a medium access control (MAC) authentication error, a MAC encryption error, an Internet protocol (IP) encryption error, an end-to-end (E2E) cyclic redundancy check (CRC) error, an E2E alive counter error, a signal mismatch error, an insufficient data error, a precision time protocol (PTP) error, and a reservation failure error.

The operation method may further comprise resetting, by the controller processor, the end node when a sum of error counter values of all types of the logical error is greater than or equal to a first threshold.

The operation method may further comprise resetting, by the controller processor, the end node when the error counter value of a first type among all types of the logical error is greater than or equal to a second threshold.

Further, in accordance with embodiments of the present disclosure, an operation method performed in a switch including a processor in an Ethernet-based vehicle network may comprise performing, by the processor, a monitoring operation of a signal on all ports of the switch; detecting, by the processor, a physical error based on results of the monitoring operation; determining, by the processor, a type of the physical error based on information of the physical error; and classifying, by the processor, the physical error with a critical error or a non-critical error based on the type of the physical error.

The physical error is at least one of a link error, a cyclic redundancy check (CRC) error, a carrier extension error, a false carrier error, a premature end error, a receive (Rx) error, a transmit (Tx) error, and a lock error.

The operation method may further comprise, when the physical error is the critical error, resetting, by the processor, one or more ports in which the physical error is occurred.

The operation method may further comprise, when the physical error is the non-critical error, increasing, by the processor, an error counter value of a first port in which the physical error is occurred; and warning, by the processor, occurrence of the physical error when the error counter value of the first port or a sum of error counter values of the all port is less than a threshold.

The operation method may further comprise, when the physical error is the non-critical error, increasing, by the processor, an error counter value of a first port in which the physical error is occurred; and resetting, by the processor, the first port when the error counter value is greater than or equal to a threshold.

The operation method may further comprise, when the physical error is the non-critical error, increasing, by the processor, an error counter value of a first port in which the physical error is occurred; and resetting, by the processor, the switch when a sum of error counter values of the all ports is greater than or equal to a threshold.

According to the embodiments of the present disclosure, proposed are an Ethernet communication apparatus of a vehicle and an error recovery method therefor, which can perform error handling and recovery according to the type and level of physical and logical errors occurring during Ethernet communications applied to the vehicle.

According to the embodiments of the present disclosure, the type and severity of physical errors occurring in the PHY layer and the controller during Ethernet communications can be classified, and an appropriate error handling and recovery can be performed according to the classified type and severity of the physical errors. Therefore, communication stability can be ensured and quick error recovery for a critical error can be enabled.

According to the embodiments of the present disclosure, the type and severity of logical errors occurring in the PHY layer and the controller during Ethernet communications can be classified, and an appropriate error handling and recovery can be performed according to the classified type and severity of the logical errors. Therefore, communication stability can be ensured and quick error recovery for a critical error can be enabled.

According to the embodiments of the present disclosure, the type and severity of logical errors and logical errors occurring in the PHY layer and the controller during Ethernet communications can be classified, and an appropriate error handling and recovery can be performed according to the classified type and severity of the logical errors and physical errors. Therefore, communication stability can be ensured and quick error recovery for a critical error can be enabled.

BRIEF DESCRIPTION OF DRAWINGS

Embodiments of the present disclosure will become more apparent by describing in detail forms of the present disclosure with reference to the accompanying drawings, in which.

Figure 1:
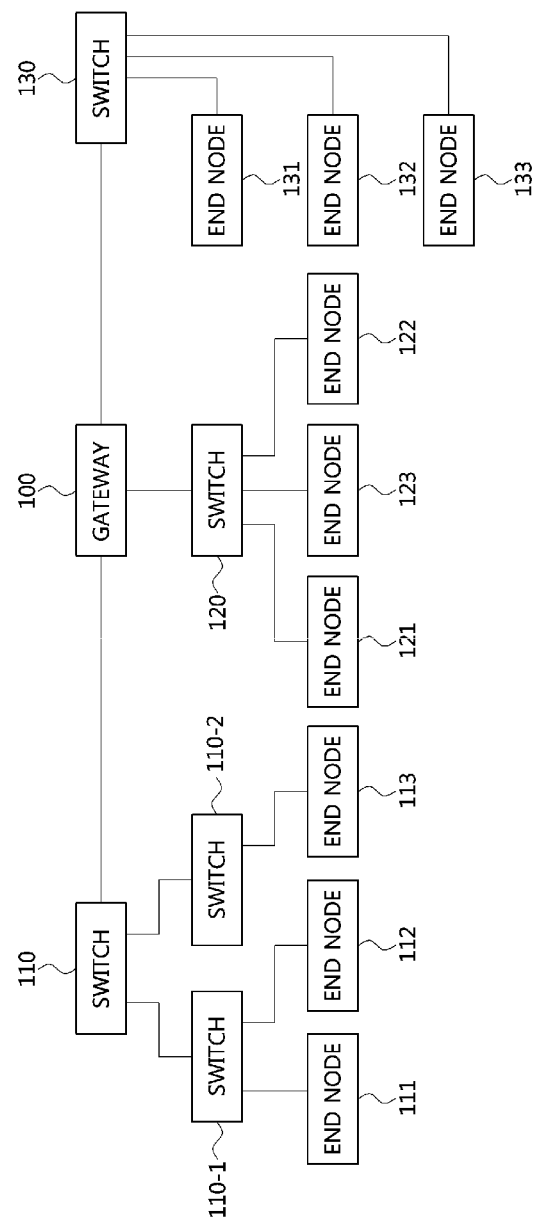
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

The communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
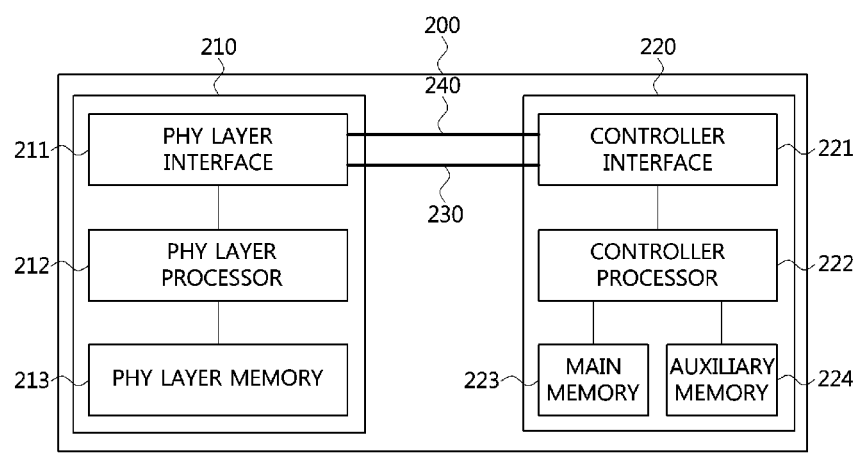
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network illustrated in, e.g., FIG. 1, may include a physical (PHY) layer 210 and a controller 220. The communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The PHY layer 210 and the controller 220 may be connected via a management data input/output (MDIO) 240 as well as the MII 230.

The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Hereinafter, a method performed at a communication node belonging to a vehicle network and a corresponding counterpart communication node will be described. Hereinafter, even when a method (e.g., transmission or reception of a signal) to be performed at a first communication node is described, a corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

Figure 3:
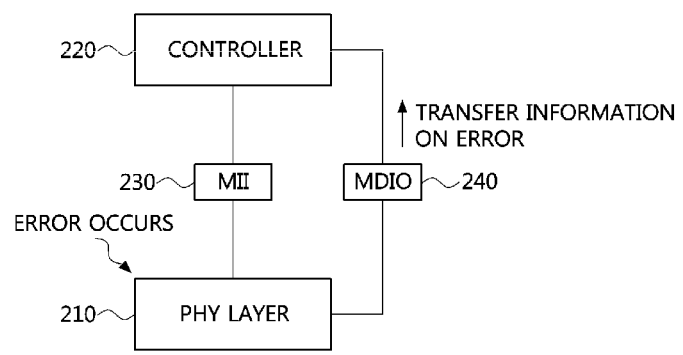
FIG. 3 is a block diagram illustrating that a physical error occurs at an end node.

FIG. 3 is a block diagram illustrating that a physical error occurs at an end node.

Referring to FIG. 3, the controller 220 may be connected to the PHY layer 210, and may control the PHY layer 210. The PHY layer 210 and the controller 220 disposed at an end node may be connected through the MII 230 and the MDIO 240. The functions of the PHY layer 210 and the controller 220 shown in FIG. 3 may be the same as or similar to those of the PHY layer 210 and the controller 220 shown in FIG. 2.

The MII 230 may refer to an interface defined in IEEE 802.3, and one of RMII, GMII, RGMII, SGMII, and XGMII may be used instead of the MII 230. The data interface may include a transmission channel and a reception channel, each of which may have independent clock, data, and control signal.

The MDIO 240 is defined in IEEE RFC 802.3ae and consists of a two-signal interface, one signal for the clock and one signal for the data. As an example, the MDIO 240 may use a clock of 2.5 MHz or less, and may transmit and receive data through a bidirectional data port.

A port of PHY layer 210 may fail or a connection with another device or switch may fail due to a contact failure or the like. These may be classified as a physical error of the PHY layer 210. For example, the PHY layer processor 212 may determine that a physical error has occurred if no signal is received from a specific port or a plurality of ports of the PHY layer 210, or a noise exceeding an allowed level is received with the signal. The PHY layer processor 212 may transmit information on occurrence of the error (i.e., error information) to the PHY layer interface 211. The PHY layer interface 211 may transmit the error information to the controller 220 via the MDIO 240.

As shown in Table 1 below, the physical errors of the PHY layer 210 detectable by the PHY layer processor 212 may include a link error, a cyclic redundancy check (CRC) error, a carrier extension error, a bad start-of-stream delimiter (SSD) error (or, a false carrier error), a bad end-of-stream delimiter (ESD) error (or, a premature end error), a receive (Rx) error, a transmit (Tx) error, and a lock error.

TABLE 1

| Physical errors | Classification of errors |
| --- | --- |
| Link Error | Critical error |
| CRC Error | CRC counting error |
| Carrier Extension Error | Carrier counting error |
| Bad SSD (False Carrier) Error | SSD counting error |
| Bad ESD (Premature End) Error | Critical error |
| Receive Error | Rx counting error |
| Transmit Error | Tx counting error |
| Lock Error | Critical error |

The PHY layer processor 212 may detect a physical error of a received message, and transfer information on the detected physical error (i.e., error information) to the controller 220. The controller processor 222 of the controller 220 may check the error information received from the PHY layer processor 212 and classify the detected physical error into one of the link error, the CRC error, the carrier extension error, the bad SSD (false carrier) error, the bad ESD (premature end) error, the receive error, the transmit error, and the lock error.

For example, when an error occurs that a link connecting another device and the PHY layer 210 is blocked or disconnected and the PHY layer cannot receive any message, the PHY layer 210 may transmit error information on the error to the controller 220. The controller processor 222 of the controller 220 may check the error information received from the PHY layer processor 212 and identify the error occurring in the PHY layer 210 as the link error.

The PHY layer processor 212 may perform CRC error detection on the received message. If the CRC error detection on the received message is not normally performed, the PHY layer processor 212 may transmit error information on the error to the controller 220. The controller processor 222 of the controller 220 may check the error information received from the PHY layer processor 212, and identify the error occurring in the PHY layer 210 as the CRC error.

Further, when the number of bits of the received message is different from an extension bit set for ensuring compatibility and collision detection among Ethernet networks, the PHY layer processor 212 may transmit error information on the error to the controller 220. The controller processor 222 of the controller 220 may check the error information received from the PHY layer processor 212, and identify the error occurring in the PHY layer 210 as the carrier extension error.

When the PHY layer processor 212 detects that a false carrier has occurred as if the PHY layer 210 transmitted a signal, the PHY layer processor 212 may transmit error information on the error to the controller 220. The false carrier may occur at the beginning of data at which a preamble of the data is decoded. The controller processor 222 of the controller 220 may check the error information received from the PHY layer processor 212, and identify the error occurring in the PHY layer 210 as the bad SSD (false carrier) error.

The controller processor 222 may classify the type of the physical error occurring in the PHY layer 210 as follows. As shown in Table 1 above, the controller processor 222 may classify the link error, the bad ESD error, and the lock error into a critical error. The controller processor 222 may classify the bad SSD error, the CRC error, the carrier extension error, the receive error, and the transmit error into a countable error.

Specifically, the controller processor 222 may classify the CRC error among the countable errors as a CRC counting error. Also, the controller processor 222 may classify the carrier extension error as a carrier counting error. Also, the controller processor 222 may classify the bad SSD (false carrier) error as an SSD counting error. Also, the controller processor 222 may classify the receive error as an Rx counting error and the transmit error as a Tx counting error.

The controller processor 222 of the controller 220 may apply different error handling and recovery schemes depending on the type of the physical error and the severity level (e.g., error counter value) of the physical error occurring in the PHY layer 210.

To this end, the controller processor 222 may include error counters for counting errors by the types of physical errors. The error counters may include a CRC error counter, a carrier error counter, an SSD error counter, an Rx error counter, and a Tx error counter.

The controller processor 222 may increase the error counter corresponding to the corresponding error type by +1 each time the corresponding countable error is detected, and reduce the error counter by −1 when communication is normally performed.

For example, if the controller processor 222 detects a false carrier error that a false carrier occurs, the controller processor 222 may increase the SSD error counter by +1 each time the bad SSD (false carrier) error is detected.

The controller processor 222 may calculate a total error counter value by summing all of the error counter values for the respective error types, and apply an error handling and recovery scheme differently according to the total error counter value.

For example, the controller processor 222 of the controller 220 may perform the error handling and recovery of the physical errors in four major ways depending on the error counter value as follows:

1. The controller processor 222 may warn of error occurrence, when the error counter value is greater than zero and less than or equal to a first value (e.g., 96) (i.e., 0<the error counter value≤96).

2. The controller processor 222 may determine that errors have occurred but communication can be performed, and may maintain the communication as it is, when the error counter value is greater than the first value (e.g., 96) and less than or equal to a second value (e.g., 126) (i.e., 96<the error counter value≤126).

3. The controller processor 222 may determine that errors of the network are serious and prohibit change of network configuration, when the error counter value is greater than the second value (e.g., 126) and less than or equal to a third value (e.g., 256) (i.e., 126<the error counter value≤256).

4. When the error counter value is greater than the third value (e.g., 256) (i.e., 256<the error counter value), the controller processor 222 may store error information in the auxiliary memory 224 shown in FIG. 2, and perform a reset of the end node. Here, the controller processor 222 may perform a reset of the PHY layer or the MAC layer.

On the other hand, if a critical error such as the link error, the bad ESD (premature end) error, or the lock error is detected, the controller processor 222 may store the error information in the auxiliary memory 224 and stop the communication. Here, the controller processor 222 may stop the communication while the critical error is continuously detected. The controller processor 222 may monitor whether the critical error has occurred for a predetermined time, and may resume the communication if no critical error is detected for the predetermined time.

Figure 4:
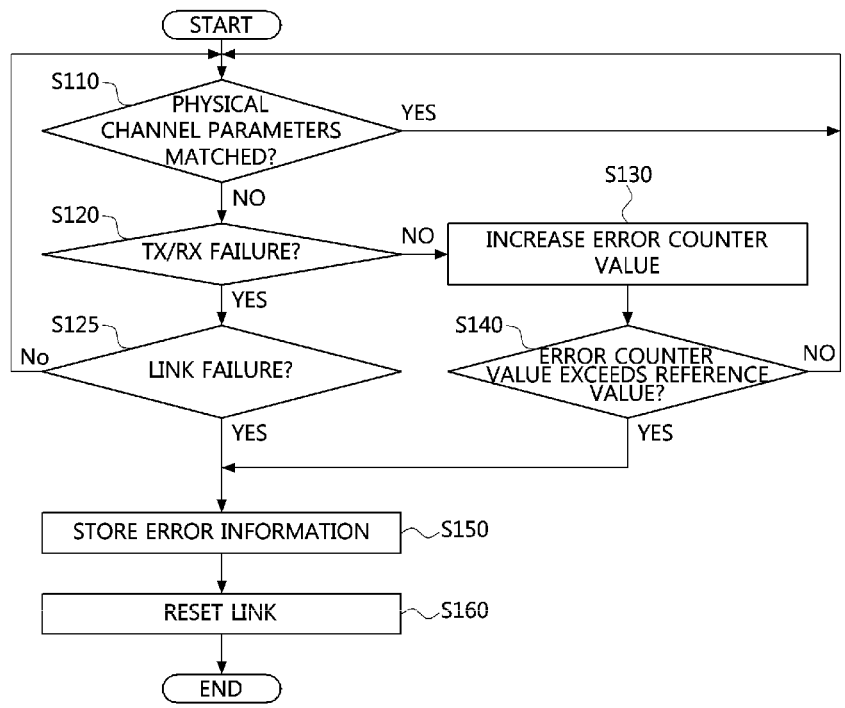
FIG. 4 is a flow chart illustrating an error handling and recovery method when a physical error occurs at an end node.

FIG. 4 is a flow chart illustrating an error handling and recovery method when a physical error occurs at an end node. Hereinafter, with reference to FIG. 4, a description will be made in detail of an error handling and recovery method for a physical error occurring in the PHY layer.

The controller processor 222 of the controller 220 may compare a physical channel parameter of a received message with a physical channel parameter stored in the auxiliary memory 224 to determine whether the physical channel parameters are matched (S110). For example, it is possible to determine whether or not they are matched by comparing a data transmission speed, a link value, and master and slave setting information of the received message with a data transmission speed, a link value, and master and slave setting information stored in the auxiliary memory 224.

As a result of the determination in the step S110, the controller processor 222 may determine that the message has been normally received when the physical channel parameters are matched, and return to the step S110.

On the other hand, when it is determined in the step S110 that the physical channel parameters are mismatched, the controller processor 222 may determine whether the type of the occurred error is a transmission failure or a reception failure (S120). Here, the controller processor 222 may determine that the transmission failure has occurred if a message transferred from the controller 220 to the PHY layer 210 is not normally transmitted to another end node or switch. Also, the controller processor 222 may determine that the reception failure has occurred if any message is not received by the PHY layer 210 for a predetermined period of time.

As a result of the determination in the step S120, the controller processor 222 may increase the error counter value because a critical error has not occurred if the transmission failure or the reception failure has not occurred. For example, the controller processor 222 may increase a carrier error counter value among the counters by +1 (S130).

Then, the controller processor 222 may determine whether the error counter value exceeds a reference value (threshold) (S140).

As a result of the determination in the step S140, if the error counter value does not exceed the reference value, the controller processor 222 may return to the step S110 and perform the step S110 and the procedures subsequent to the step S110. On the other hand, if it is determined in the step S140 that the error counter value exceeds the reference value, the controller processor 222 may store the error information in the auxiliary memory 224 (S150).

As a result of the determination in the step S140, the controller processor 222 may warn of error occurrence, when the error counter value is greater than zero and less than or equal to a first value (e.g., 96) (i.e., 0<the error counter value≤96).

The controller processor 222 may determine that errors have occurred but communication can be performed, and may maintain the communication as it is, when the error counter value is greater than the first value (e.g., 96) and less than or equal to a second value (e.g., 126) (i.e., 96<the error counter value≤126).

Also, the controller processor 222 may determine that errors of the network are serious and prohibit change of network configuration, when the error counter value is greater than the second value (e.g., 126) and less than or equal to a third value (e.g., 256) (i.e., 126<the error counter value≤256).

As the result of the determination in the step S140, when the error counter value is greater than the third value (e.g., 256) (i.e., 256<the error counter value), the controller processor 222 may store error information in the auxiliary memory 224 shown in FIG. 2.

Returning to the step S120, when it is determined in the step S120 that the type of the detected error is a transmission failure or a reception failure of the message, the controller processor 222 may determine whether a link failure has occurred (S125). Here, even when the link of the PHY layer is normally maintained, a transmission failure or a reception failure of the message may occur due to another error. On the other hand, if a link connecting another device to the PHY layer 210 is blocked or disconnected, a transmission failure and a reception failure of the message may occur.

The PHY layer processor 212 may check a connection state of the link to detect the link failure and transfer information on the link failure to the controller 220. The controller processor 222 of the controller 220 may check the information on the link failure received from the PHY layer 212, and determine whether the error occurring in the PHY layer 210 is a link error.

As a result of the determination in the step S125, when the type of the detected error is not the link failure, the controller processor 222 may return to the step S110 and perform the step S110 and the procedures subsequent to the step S110 because the message transmission failure or the reception failure may occur due to a temporary error. On the other hand, as the result of the determination in the step S125, when the type of the detected error is the link failure, the controller processor 222 may store error information in the auxiliary memory 224 because the occurred error corresponds to a critical error (S150).

After the step S150, the controller processor 222 may reset the link between the communication nodes (e.g., a link between end nodes, a link between the end node and the switch, a link between the switches, etc.) (S160). Here, the controller processor 222 may perform a reset of the PHY layer or the MAC layer, and the power of the PHY layer may be turned off and then turned on to reset the link. After the controller processor 222 detects an error, the controller processor 222 may transfer the information on the error to a system application and request the system application to reset the link so that the link between the communication nodes is reset. Alternatively, a PHY layer of the MDIO 240 may be reset to reset the link. Alternatively, the MAC layer may be reset to reset the link.

As described above, according to an embodiment of the present disclosure, the type and severity level (e.g., error counter value) of the physical errors occurring in the in the PHY layer 210 and the controller 220 while performing Ethernet communications can be classified, and an appropriate error handling and recovery can be performed according to the classified type and severity level of the physical errors, so as to ensure communication stability and enable quick error recovery when a critical error occurs.

Figure 5:
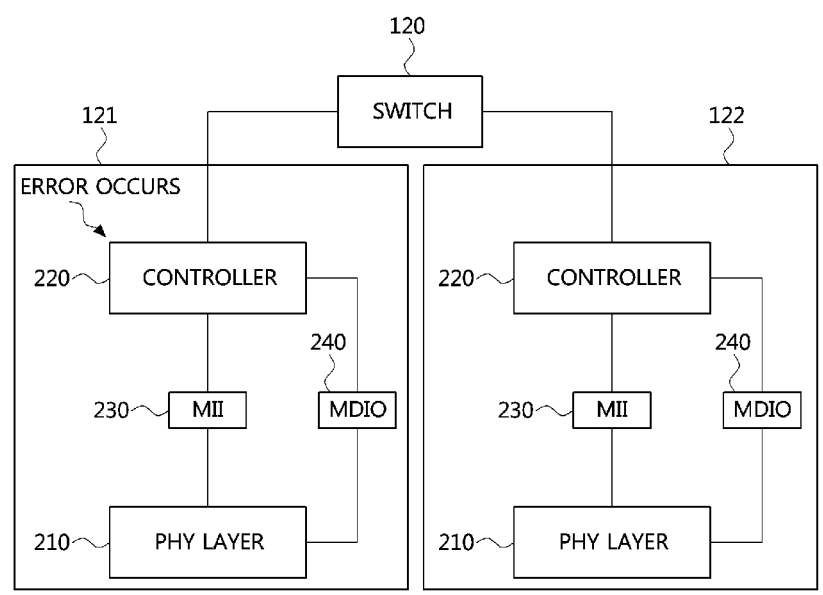
FIG. 5 is a block diagram illustrating that a logical error occurs at an end node.

FIG. 5 is a block diagram illustrating that a logical error occurs at an end node.

Referring to FIG. 1 and FIG. 5, the switch 120 may be connected to the plurality of end nodes 121 and 122 and a gateway (not shown). The plurality of end nodes 121 and 122 may be interconnected via the switch 120. Also, each of the plurality of end nodes 121 and 122 may be connected to the gateway via the switch 120. The switch 120 may include an electric control unit (ECU) and may control the plurality of end nodes 121 and 122 through the ECU of the switch 120. Each of the plurality of end nodes 121 and 122 may be an infotainment device (e.g., a display device), a navigation device, an around (surround) view monitoring device, or the like and may include an ECU.

Even when a message is normally received through the PHY layer 210 of each of the plurality of end nodes 121 and 122, a logical error such as a message format change, a link information error, reception of an undefined message, reception of incomplete or erroneous Ethernet data, and a reception timeout of a periodic message may occur.

Referring to FIG. 2 together, the PHY layer 210 may transfer the received message to the controller 220 via the MII 230, and a logical error of the received message may be detected by the controller processor 222 of the controller 220.

The auxiliary memory 224 of the controller 220 may store information on message formats, information on the devices disposed in the vehicle, and information on the devices permitted to be accessed from outside of the vehicle. The controller processor 222 may detect a logical error by identifying that a message is received from an undefined device based on the information stored in the auxiliary memory 224. The controller processor 222 of the controller 220 may detect a logical error when receiving incomplete or erroneous Ethernet data.

The logical error that can be detected by the controller 220 may include a MAC authentication error, a MAC encryption error, an internet protocol (IP) (TCP/UDP) encryption error, an End-to-End (E2E) CRC error, an E2E alive counter error, a signal mismatch error, an insufficient data (or, Audio Video Bridging (AVB)) error, a precision time protocol (PTP) error, a reservation failure error, and the like.

TABLE 2

| Logical Error | Description |
|---|---|
| MAC authentication error | MAC authentication error counter |
| MAC encryption error | MAC secure error counter |
| IP (TCP/UDP) encryption error | IP secure error counter |
| E2E CRC error | E2E CRC error counter |
| E2E alive counter error | E2E alive error counter |
| signal mismatch error | Signal error counter |
| insufficient data (AVB) error | AVB data error counter |
| PTP error | PTP error counter |
| reservation failure error | Reservation error counter |

Here, the controller processor 222 of the controller 220 may apply an error handling and recovery scheme differently depending on the type and severity level (e.g., the error counter value) of the logical error.

The controller processor 222 may include error counters for counting the respective logical errors by the types of the logical errors. As shown in Table 2 above, the error counters for counting the respective logical errors may include a MAC authentication error counter for counting the MAC authentication errors, a MAC secure error counter for counting the MAC encryption errors, an IP secure error counter for counting the IP (TCP/UDP) encryption errors, an E2E CRC error counter for counting the E2E CRC errors, an E2E alive error counter for counting the E2E alive counter errors, a signal error counter for counting the signal mismatch errors, an AVB data error counter for counting the insufficient data (AVB) errors, a PTP error counter for counting the PTP errors, and a reservation error counter for counting the reservation failure errors.

The controller processor 222 may increase the error counter value corresponding to the corresponding error type by +1 each time a logical error is detected. The controller processor 222 may perform an error handling and recovery scheme differently based on the error counter value for each error type after the error counting for each error type. The controller processor 222 may sum all of the error counter values for the respective logical error types and differently perform error handling and recovery according to the total error counter value.

Here, errors may occur uniformly in all the units, and errors may intensively occur in a specific unit. The controller processor 222 may store information on the errors in the auxiliary memory 224 when the total error counter value exceeds a reference value by reflecting the characteristics of the error occurrences, and reset all the links connected to the PHY layer 210. The controller processor 222 may store the information on the errors in the auxiliary memory 224 and reset a link connected with the PHY layer 210 in which the errors are concentrated, when the errors are concentrated in a specific unit. In addition, the controller processor 222 may block communication with the specific unit if the occurrence of errors is concentrated in the specific unit even after the link is reset.

The controller processor 222 may perform the error handling and recovery of the logical errors in four major ways depending on the error counter value as follows:

1. The controller processor 222 may determine that errors start to occur and warn of error occurrence, when the error counter value is greater than zero and less than or equal to a first value (e.g., 96) (i.e., 0<the error counter value≤96). Here, the controller processor 222 may maintain communication, and transfer information on the error occurrence to the connected PHY layer 210 and adjacent communication nodes.

2. The controller processor 222 may determine that errors have occurred but communication can be performed, and may maintain the communication as it is, when the error counter value is greater than the first value (e.g., 96) and less than or equal to a second value (e.g., 126) (i.e., 96<the error counter value≤126).

3. The controller processor 222 may determine that errors of the network are serious and prohibit change of network configuration, when the error counter value is greater than the second value (e.g., 126) and less than or equal to a third value (e.g., 256) (i.e., 126<the error counter value≤256).

4. When the error counter value is greater than the third value (e.g., 256) (i.e., 256<the error counter value), the controller processor 222 may store error information in the auxiliary memory 224 shown in FIG. 2. Then, the controller processor 222 may perform a reset of the end node, and notify a result of the reset of the end node to an application.

Figure 6:
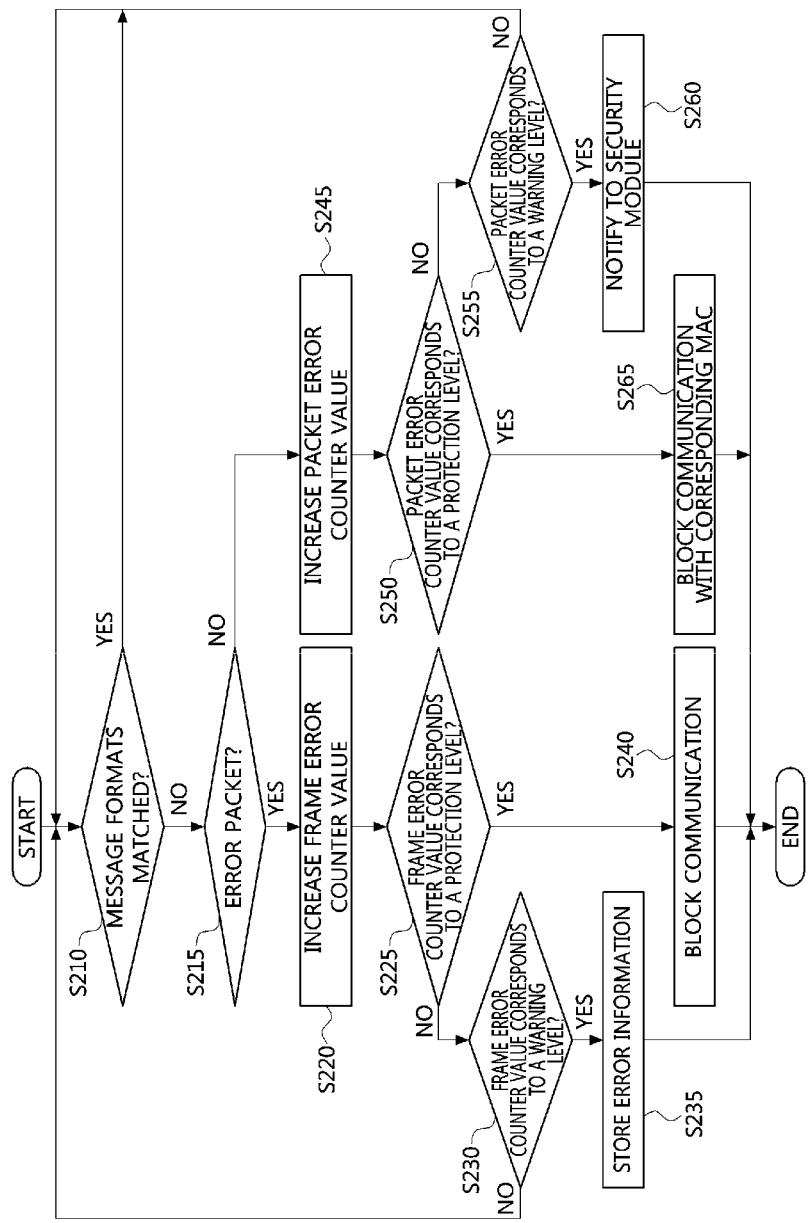
FIG. 6 is a flow chart illustrating an error handling and recovery method when a logical error occurs at an end node.

FIG. 6 is a flow chart illustrating an error handling and recovery method when a logical error occurs at an end node. Hereinafter, with reference to FIG. 2 and FIG. 6, an error handling and recovery method in the controller when a logical error occurs will be described in detail.

The PHY layer 210 of each end node may receive a message (e.g., a message in a packet form) from another communication node, and the controller processor 222 of the controller 220 may determine whether a format of the message received at the PHY layer 210 matches the message format stored in the auxiliary memory 224. Since the Ethernet message has a fixed format, a database (DB) of each end node may store a port number, an IP address, and a MAC address of the received message. Here, the DB of each node may be included in the auxiliary memory. When a message is received, the port number, the IP address, and the MAC address stored in the DB may be compared with a port number, an IP address, and a MAC address of the received message to determine whether a normal message is received (S210).

As a result of the determination in the step S210, when the format of the received message matches the message format stored in the auxiliary memory 224, the controller processor 222 may determine that a normal message has been received, and return to the step S210. On the other hand, when it is determined that the format of the received message does not match the message format stored in the auxiliary memory 224, the controller processor 222 may determine that an abnormal message has been received.

Figures 7, 8:
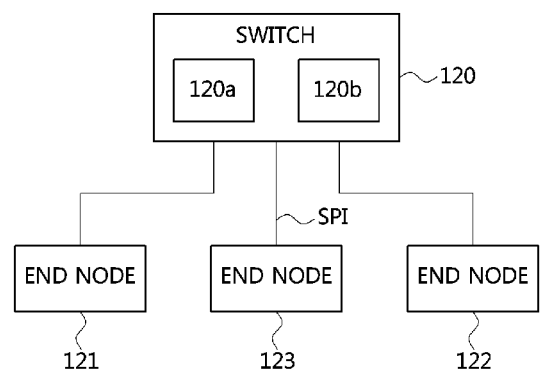
FIG. 7 is a diagram illustrating an Ethernet message format.
FIG. 8 is a block diagram illustrating that a physical error occurs at a switch.

Here, when the message received at the end node meets a predetermined Ethernet message format as shown in FIG. 7, but includes an undefined value or a value different from values defined for use in a specific vehicle or vehicle system, the controller processor 222 may determine that a packet error has occurred. For example, when a message having a source IP address of 0xFFFF F123 is transferred to an end node (e.g., head unit) from a gateway, if the source IP address of the message does not indicate the gateway, the controller processor 222 may determine that a packet error has occurred. Also, if the source IP address of the received message is not defined in the memory (or communication database) of the end node, the controller processor 222 may determine that a packet error has occurred.

When transmitting and receiving Ethernet messages, a payload area may be defined in each of the Ethernet messages. In order to guarantee transmission and reception, a CRC and an alive count may be used for the pay load. In case that a security code is defined in the payload, the controller processor 222 may determine that a frame error has occurred when a content included in the payload does not match a predetermined content.

After the step S210, the controller processor 222 may detect an error in the received message. Here, the controller processor 222 may determine whether the detected error is due to an error packet (S215).

As a result of the determination in the step S215, when the detected error is not caused by the error packet, the controller processor 222 may increase the error counter. For example, the controller processor 222 may increase a frame error counter value by +1 (S220).

Then, the controller processor 222 may determine whether the frame error counter value corresponds to a level requiring protection (i.e., protection level) (S225).

As a result of the determination in the step S225, when the frame error counter value does not exceed the protection level, the controller processor 222 may determine whether the frame error counter value exceeds a warning level (S230).

As a result of the determination in the step S230, when the frame error counter value exceeds the warning level, the controller processor 222 may store information on the error in the auxiliary memory 224 (S235).

On the other hand, when it is determined in the step S230 that the frame error counter value does not exceed the warning level, the controller processor 222 may maintain the communication since the errors have occurred but the communication is possible, and return to the step S210.

Returning to the step S225, when it is determined in the step S225 that the error counter value exceeds the protection level, the controller processor 222 may block communications with the corresponding unit generating the error (S240). For example, when the error counter value is greater than a first value (e.g., 96), the controller processor 222 may determine that the errors are concentrated at the specific unit, and block the communications with the specific unit. The controller processor 222 may store information on the error in the auxiliary memory 224 even if the frame error counter value exceeds the protection level.

Returning to the step S215, as a result of the determination in the step S215, when the detected error is caused by the error packet, the controller processor 222 may increase the error counter. For example, the controller processor 222 may increase a packet error counter value by +1 (S245).

Then, the controller processor 222 may determine whether the packet error counter value corresponds to a protection level (S250).

As a result of the determination in the step S250, when the packet error counter value does not exceed the protection level, the controller processor 222 may determine whether the packet error counter value exceeds a warning level (S255).

As a result of the determination in the step S255, when the packet error counter value exceeds the warning level, since the communication is possible, but a communication failure may occur due to the packet error, the controller processor 222 may inform a security module of the end node of information on the error (S260). Here, each end node may include a security module, and each end node may transmit the information stored in the security module to the gateway. The gateway may collect and store the information received from the security module of each end node.

On the other hand, when it is determined in the step S255 that the packet error counter value does not exceed the warning level, the controller processor 222 may determine that the communication is possible, and perform subsequent procedures by returning to the step S210.

On the other hand, as a result of the determination in the step S250, when the packet error counter value exceeds the protection level, the controller processor 222 may reset the link of the PHY layer 210 to block the communication. Also, when the error counter value exceeds the protection level, the controller processor 222 may reset a link with the MAC layer to block the communication (S265).

As described above, according to an embodiment of the present disclosure, the type and severity level (e.g., error counter value) of the logical errors occurring in the in the PHY layer 210 and the controller 220 while performing Ethernet communications can be classified, and an appropriate error handling and recovery can be performed according to the classified type and severity level of the logical errors, so as to ensure communication stability and enable quick error recovery when a critical error occurs.

FIG. 8 is a block diagram illustrating that a physical error occurs at a switch.

Referring to FIG. 8, the switch 120 may include a switch processor 120*a* and a memory 120*b*. Here, the switch processor 120*a* may increase an error counter value each time an error of a type corresponding to the error counter occurs. The switch 120 may include a plurality of ports for connection with the plurality of end nodes 121, 122, 123, other switches and gateways. The plurality of end nodes 121, 122 and 123 may be interconnected via the switch 120 and the plurality of end nodes 121, 122 and 123 may be connected to the gateway through the switch 120. The switch 120 and the plurality of end nodes 121, 122 and 123 may be connected via an SPI interface, and the switch 120 may control each of the plurality of end nodes 121, 122 and 123 connected thereto.

The plurality of end nodes 121, 122 and 123 may mean ECUs for controlling various devices included in the vehicle. For example, each of the plurality of end nodes 121, 122 and 123 may include an ECU constituting an infotainment device (e.g., a display device), a navigation device, an around (surround) view monitoring device, or the like.

During the Ethernet communication of the vehicle, a physical error may occur in some of the plurality of ports included in the switch 120. The switch processor 120a may detect a physical error occurring at all of the plurality of ports or a specific port by monitoring data packets transmitted and received at all of the plurality of ports.

The switch processor 120a may perform error handling and recovery based on the number and severity level (e.g., error counter value) of ports where the physical errors have occurred. For example, the switch processor 120a may detect physical errors occurring at all or specific ports of the switch 120 and classify the types of the detected physical errors. At this time, when it is determined that the type of the physical error is a transmission failure, a reception failure, or a link failure, the switch processor 120a may determine that the physical error is a critical error and store information on the error in the memory 120b, and recover the error by resetting links connected to all the ports.

On the other hand, when the type of the physical error is not the transmission failure, the reception failure, or the link failure, the switch processor 120a may increase the error counter value each time an error corresponding to the error counter. To this end, the switch processor 120a may include error counters for counting errors of the respective error types.

The switch processor 120a may calculate a total error counter value by summing all of the error counter values for the respective error types. When the total error counter value (i.e., the total sum of the error counter values of the entire ports) exceeds a reference value (e.g., 256) (i.e., 256<total error counter value), the switch processor 120a may store information on the error in the memory 120b, and recover the error by resetting links connected with the entire ports.

As another example, the switch processor 120a may increase the error counter value each time an error is detected for a specific port. For example, the switch processor 120a may increase a channel error counter value whenever an error occurs at the specific port. The switch processor 120a may store information on the error in the memory 120b when the channel error counter value of the specific port exceeds a reference value (e.g., 96) (i.e., 96<the channel error counter value). Then, the switch processor 120a may recover the error by resetting the link connected to the specific port where the error occurred.

On the other hand, when the error counter value of the specific port is equal to or less than the reference value (e.g., 96), the switch processor 120a may determine that communication is possible and may maintain the communication of the port.

Here, when an error does not occur in a specific port but errors occur continuously in a plurality of ports, the switch processor 120a may determine whether or not to reset the link by summing error counter values of ports where errors have occurred.

For example, the switch processor 120a may sum the error counter values of the plurality of ports in which the errors have occurred, and then store information on the errors in the memory 120b when the sum of the error counter values exceed a reference value (e.g., 256). Then, the switch processor 120a may recover the error by resetting the links connected to the plurality of ports where the errors have occurred.

On the other hand, when the sum of the error counter values does not exceed the reference value (e.g., 256), the switch processor 120a may maintain the communications of the plurality of ports where the errors have occurred.

Figure 9:
FIG. 9 is a flow chart illustrating an error handling and recovery method when a physical error occurs at a switch.

FIG. 9 is a flow chart illustrating an error handling and recovery method when a physical error occurs at a switch. With reference to FIG. 9, an error handling and recovery method when a physical error occurs in the switch will be described in detail.

The switch processor 120a may compare a physical channel parameter of a received message with a physical channel parameter stored in the auxiliary memory 224 to determine whether the physical channel parameters are matched (S310). For example, it is possible to determine whether or not they are matched by comparing a data transmission speed, a link value, and master and slave setting information of the received message with a data transmission speed, a link value, and master and slave setting information stored in the auxiliary memory 224.

As a result of the determination in the step S310, the switch processor 120a may return to the step S310 when the physical channel parameters of the entire ports are matched. On the other hand, as a result of the determination in the step S310, when the physical channel parameters of the entire ports are mismatched, the switch processor 120a may determine whether errors have occurred in all the ports configured in the switch (S320).

As a result of the determination in the step S320, when it is determined in the step S320 that errors have occurred in all the ports, the switch processor 120a may determine whether the type of the error is a transmission failure or a reception failure of data (S330).

As a result of the determination in the step S330, when a transmission failure or a reception failure of data occurs, the switch processor 120a may determine whether a link failure error has occurred (S340). Here, even if the link of the port of the switch 120 is normally maintained, the transmission failure or the reception failure may occur due to another error. On the other hand, if a link between the end node and the switch is blocked or disconnected, the transmission failure or the reception failure may occur. The switch processor 120a may check a connection status of the link to detect the link failure and may transfer information on the link failure to the end node, other switches and gateways.

As a result of the determination in the step S340, when a link failure error has not occurred, the switch processor 120a may increase an error counter. For example, the switch processor 120a may increase a channel error counter by +1 when a link failure error has not occurred. Here, since errors may occur in all the ports and an error may occur in a specific port, the switch processor 120a may increase the error counter value for each port where an error occurs (S350).

Then, the switch processor 120a may determine whether the channel error counter value exceeds a preset reference value (S360). Here, the reference value may be changed according to the number of ports where errors occur.

When it is determined in the step S360 that the channel error counter value exceeds the preset reference value, the switch processor 120*a* may determine that communication is impossible and store information on the errors in the memory 120*b* (S370).

Returning again to the step S320, when it is determined in the step S320 that errors do not occur in all the ports and an error occurs in a specific port, the switch processor 120*a* may determine whether a transmission or reception failure has occurred in the specific port (S325). Here, the switch processor 120*a* may determine that a reception failure has occurred when a message is not received from the PHY layer of the switch 120 for a predetermined time. Also, the switch processor 120*a* may determine that a transmission failure has occurred when a message transferred to the PHY layer of the switch 120 is not normally transmitted to another end node or switch.

When it is determined in the step S325 that a transmission or reception failure has occurred in a specific port, the switch processor 120*a* may proceed to a step S340 to determine whether or not the link fails, and may perform procedures after the step S340.

On the other hand, when it is determined in the step S325 that a transmission or reception failure does not occur in the specific port, the switch processor 120*a* may proceed to a step S350 to increase the channel error counter value by +1. Here, errors may occur in all the ports and an error may occur in a specific port, so that the switch processor 120*a* may increase the error counter value for each port where an error occurs.

When it is determined in the step S360 that the channel error counter value does not exceed the reference value, the switch processor 120*a* may determine that communication is possible although the errors have occurred, and maintain the communications of all the ports. The switch processor 120*a* may then return to the step S310 and perform the step S310 and the procedures subsequent to the step S310.

On the other hand, when it is determined in the step S360 that the channel error counter value exceeds the reference value, the switch processor 120*a* may determine that communication is impossible and store information on the errors in the memory 120*b* (S370).

Then, when it is determined in the step S340 that a link failure has occurred, the switch processor 120*a* may recover the error by resetting the link of the port. When it is determined in the step S360 that the error counter values of all the ports or the error counter value of the specific port exceeds the reference value, the switch processor 120*a* may recover the error by resetting the link of the ports where the error occurred (S380).

Here, when the error counter value of a specific port among the plurality of ports of the switch 120 exceeds a first reference value (e.g., 96), the switch processor 120*a* may store the error information in the memory 120*b* by performing the step S370. Then, the switch processor 120*a* may perform the S380 procedure to reset the link of the specific port where the error occurs.

On the other hand, when an error does not occur in one specific port but errors occur continuously in a plurality of ports, the switch processor 120*a* may determine whether to reset the links by reflecting the number of the ports where the errors occur.

For example, when the sum of the error counter values of the ports where the errors occur exceeds a second reference value (e.g., 256) although the error counter value of each of the ports where the errors occur does not exceed the first reference value (e.g., 96), the switch processor 120*a* may store the error information in the memory 120*b* by performing the step S370. Then, the switch processor 120*a* may perform the S380 procedure to reset the links of the ports where the errors occur.

As described above, according to an embodiment of the present disclosure, the type and severity level (e.g., error counter value) of the physical errors occurring in the in switch while performing Ethernet communications can be classified, and an appropriate error handling and recovery can be performed according to the classified type and severity level of the logical errors, so as to ensure communication stability and enable quick error recovery when a critical error occurs.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An end node in an Ethernet-based vehicle network, the end node comprising:
   a processor including a controller processor and a physical (PHY) layer processor; and
   a memory of storing at least one instruction executed by the processor, wherein the at least one instruction is configured to:
   perform a monitoring operation of a signal on a port of the end node;
   detect a physical error in the port based on results of the monitoring operation;
   transmit information of the physical error to the controller processor;
   determine a type of the physical error based on whether a physical channel parameter of the signal matches with at least one of a predetermined physical channel parameter, a receive failure of the signal, a transmit failure of the signal, and a link failure; and
   classify the physical error with a critical error or a non-critical error based on the type of the physical error.

2. The end node according to claim 1, wherein the information of the physical error is transmitted from the PHY layer processor to the controller processor through a management data input/output (MDIO).

3. The end node according to claim 1, wherein the physical error is at least one of a link error, a cyclic redundancy check (CRC) error, a carrier extension error, a false carrier error, a premature end error, a receive (Rx) error, a transmit (Tx) error, or a lock error.

4. The end node according to claim 1, wherein the at least one instruction is further configured to:
when the physical error is the critical error, reset the port in which the physical error is occurred.

5. The end node according to claim 1, wherein the at least one instruction is further configured to:
when the physical error is the non-critical error, increase an error counter value; and
warn occurrence of the physical error when the error counter value is less than a threshold.

6. The end node according to claim 1, wherein the at least one instruction is further configured to:
when the physical error is the non-critical error, increase an error counter value; and
reset the port in which the physical error is occurred when the error counter value is greater than or equal to a threshold.

7. An end node in an Ethernet-based vehicle network, the end node comprising:
a processor including a controller processor and a physical (PHY) layer processor; and
a memory of storing at least one instruction executed by the processor, wherein the at least one instruction is configured to:
obtain a message from the physical (PHY) layer processor;
detect a logical error of the message based on a reference parameter;
determine a type of the logical error based on at least whether a format of message matches a predetermined message formats, or whether the logical error is due to an error packet; and
increase an error counter value per the type of the logical error.

8. The end node according to claim 7, wherein the reference parameter is at least one of a message format used in the Ethernet-based vehicle network, information of inner communication nodes belonging to the Ethernet-based vehicle network, or information of outer communication nodes which are allowed to access the Ethernet-based vehicle network.

9. The end node according to claim 7, wherein the logical error is at least one of a medium access control (MAC) authentication error, a MAC encryption error, an Internet protocol (IP) encryption error, an end-to-end (E2E) cyclic redundancy check (CRC) error, an E2E alive counter error, a signal mismatch error, an insufficient data error, a precision time protocol (PTP) error, or a reservation failure error.

10. The end node according to claim 7, wherein the at least one instruction is further configured to:
reset the end node when a sum of error counter values of all types of the logical error is greater than or equal to a first threshold.

11. The end node according to claim 7, wherein the at least one instruction is further configured to:
reset the end node when the error counter value of a first type among all types of the logical error is greater than or equal to a second threshold.

12. An end node in an Ethernet-based vehicle network, the end node comprising:
a processor including a controller processor and a physical (PHY) layer processor; and
a memory of storing at least one instruction executed by the processor, wherein the at least one instruction is configured to:
perform a monitoring operation of a signal on all ports of a switch;
detect a physical error based on results of the monitoring operation;
determine a type of the physical error based on information of the physical error based on whether a physical channel parameter of the signal matches with at least one of a predetermined physical channel parameter, a receive failure of the signal, a transmit failure of the signal, and a link failure; and
classify the physical error with a critical error or a non-critical error based on the type of the physical error.

13. The end node according to claim 12, wherein the physical error is at least one of a link error, a cyclic redundancy check (CRC) error, a carrier extension error, a false carrier error, a premature end error, a receive (Rx) error, a transmit (Tx) error, or a lock error.

14. The end node according to claim 12, wherein the at least one instruction is further configured to:
when the physical error is the critical error, reset one or more ports in which the physical error is occurred.

15. The end node according to claim 12, wherein the at least one instruction is further configured to:
when the physical error is the non-critical error, increase an error counter value of a first port in which the physical error is occurred; and
warn occurrence of the physical error when the error counter value of the first port or a sum of error counter values of the all port is less than a threshold.

16. The end node according to claim 12, wherein the at least one instruction is further configured to:
when the physical error is the non-critical error, increase an error counter value of a first port in which the physical error is occurred; and
reset the first port when the error counter value is greater than or equal to a threshold.

17. The end node according to claim 12, wherein the at least one instruction is further configured to:
when the physical error is the non-critical error, increase an error counter value of a first port in which the physical error is occurred; and
reset the switch when a sum of error counter values of the all ports is greater than or equal to a threshold.

* * * * *